Oct. 1, 1957
L. A. TROFIMOV
2,808,140
POWER TRANSMISSION
Filed Dec. 5, 1951
7 Sheets-Sheet 1
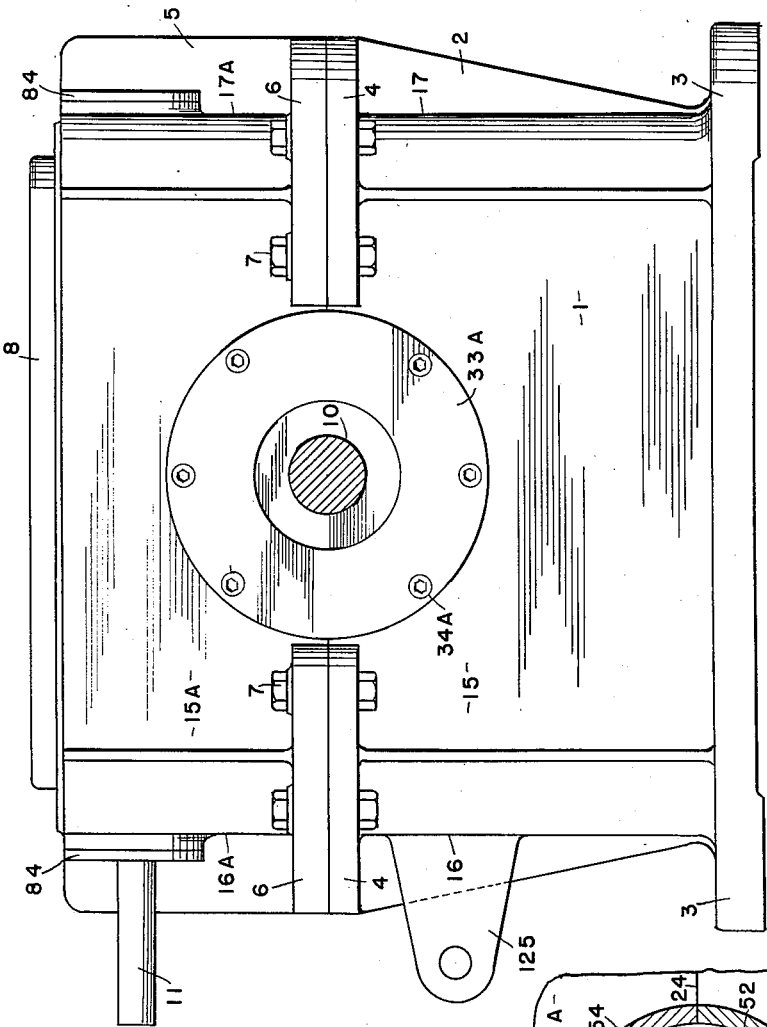
Fig. 1
Fig. 5
Fig. 6
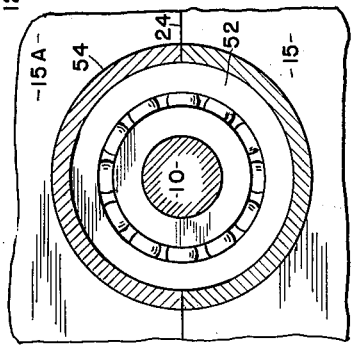
INVENTOR.
Lev A. Trofimov
BY
Attorney INVENTOR.
Lev A. Trofimov Oct. 1, 1957 L. A. TROFIMOV 2,808,140
POWER TRANSMISSION
Filed Dec. 5, 1951 7 Sheets-Sheet 3

INVENTOR.
Lev A. Trofimov
BY *Harry R. Canfield*
*attorney*

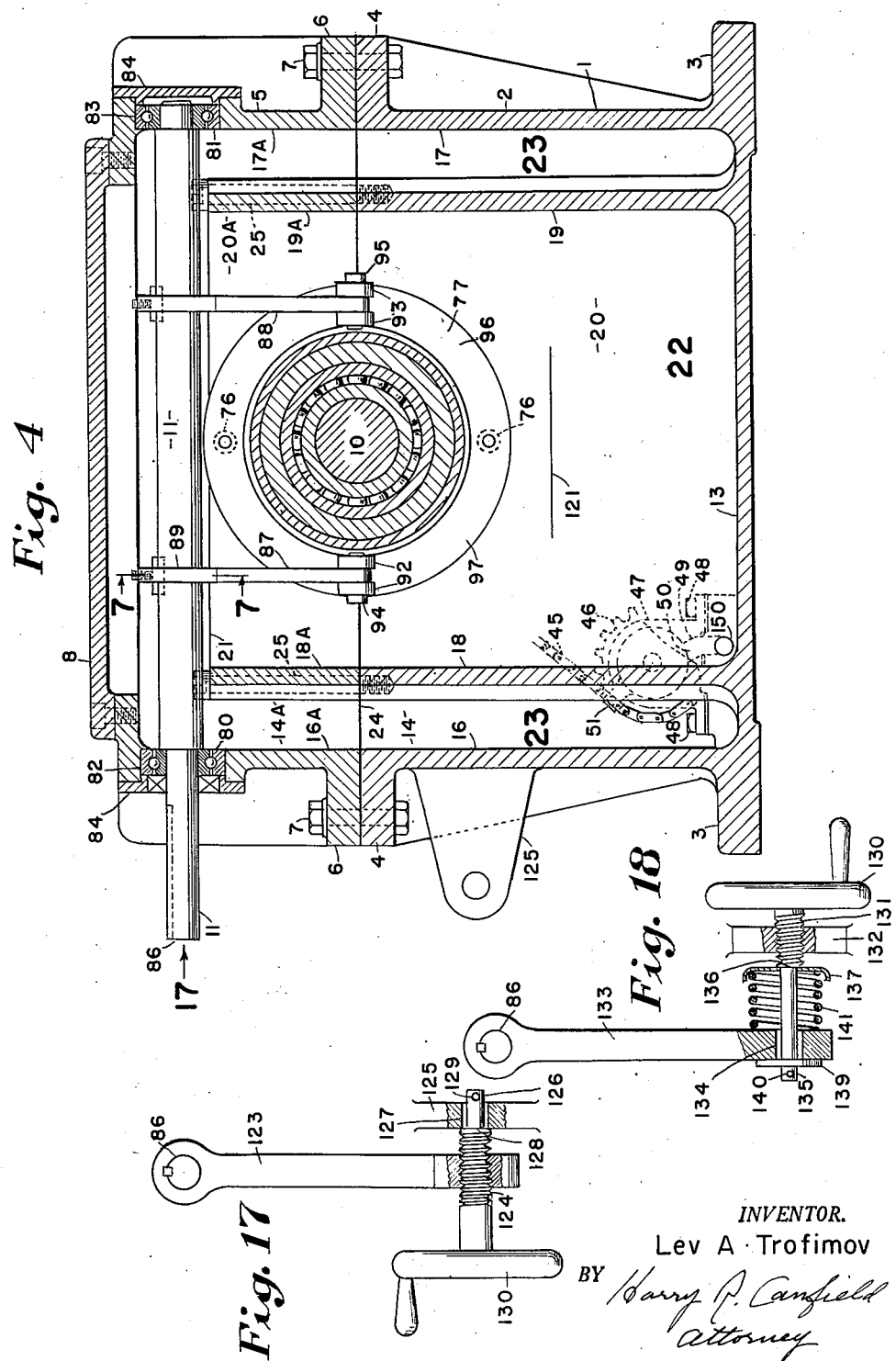

Oct. 1, 1957  L. A. TROFIMOV  2,808,140
POWER TRANSMISSION
Filed Dec. 5, 1951  7 Sheets-Sheet 5
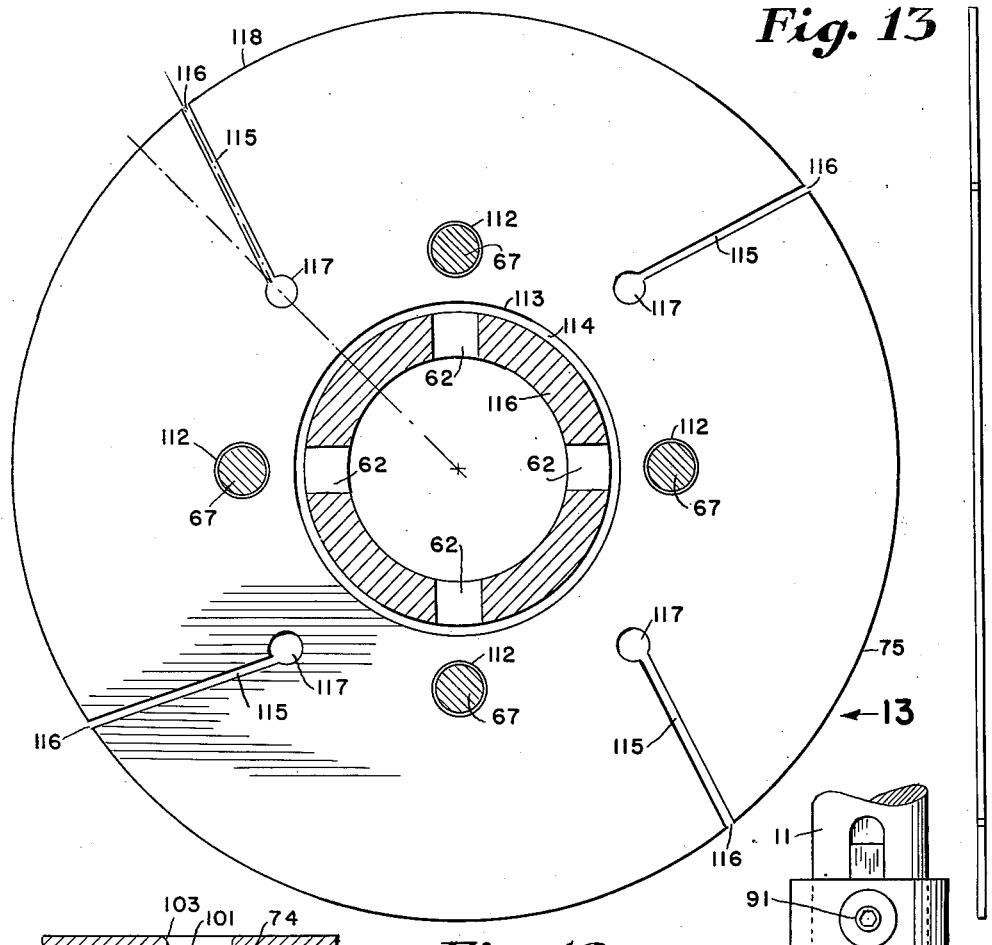
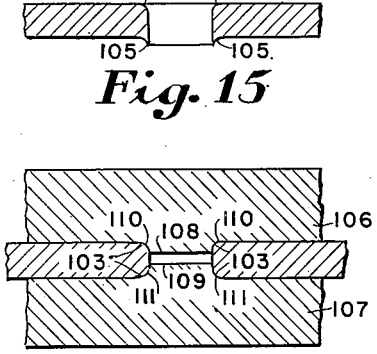
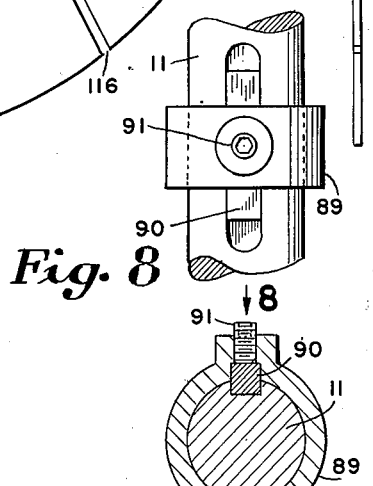
INVENTOR.
Lev A. Trofimov
BY
Harry P. Canfield
Attorney

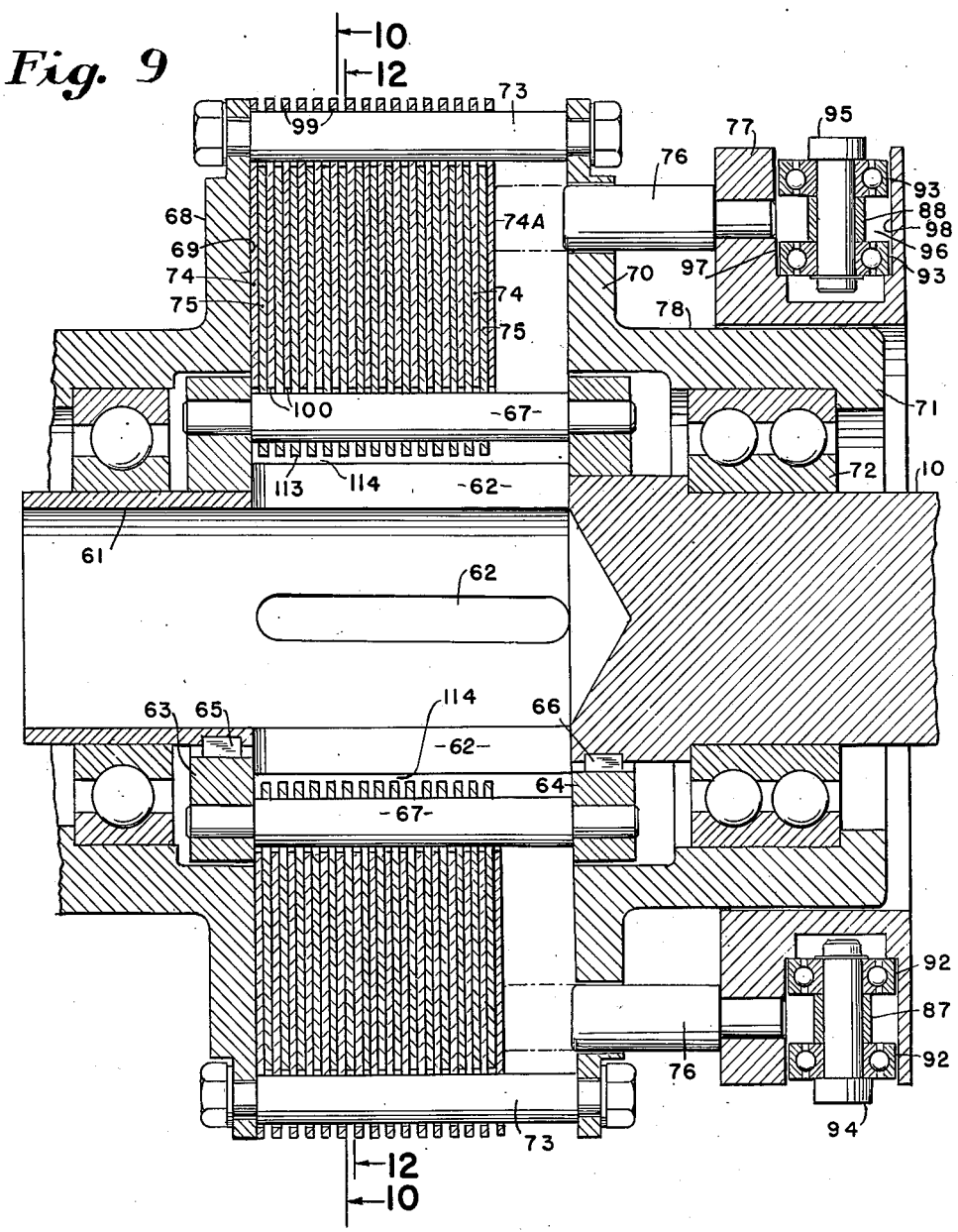

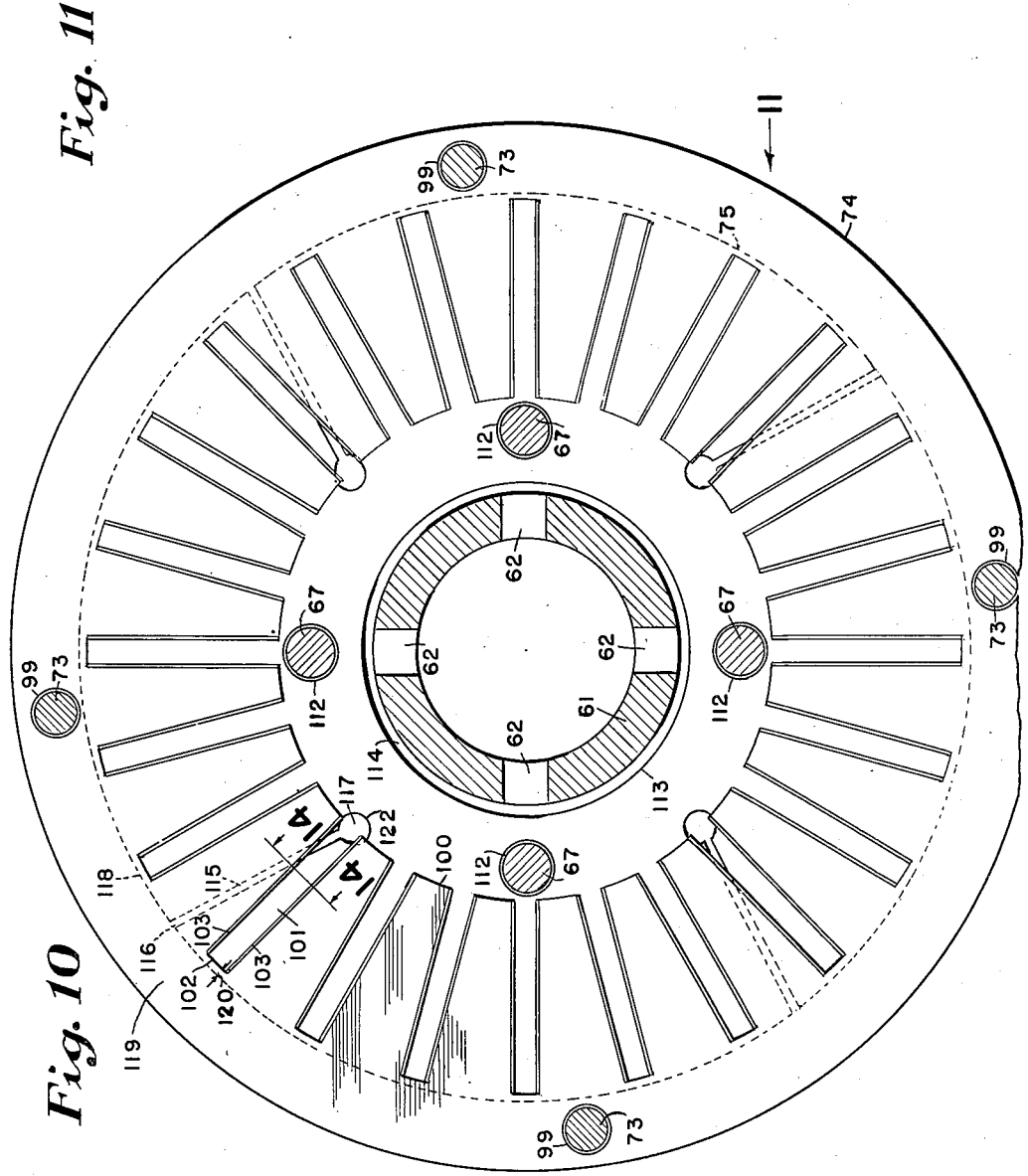

United States Patent Office

2,808,140
Patented Oct. 1, 1957

2,808,140

POWER TRANSMISSION

Lev A. Trofimov, Willoughby, Ohio, assignor to Fairchild Engine and Airplane Corporation, a corporation of Maryland Application December 5, 1951, Serial No. 259,911

7 Claims. (Cl. 192—57)

This invention relates to power transmissions that transmit the power of a motor to a driven load and that have means for controlling the transmitted power.

More particularly the invention relates to such transmissions that transmit power through an oil or other liquid film between discs without frictional sliding contact of the discs; and that control the transmitted power by controlling thickness of the films.

In my Patent No. 2,576,156 issued November 27, 1951, there is described a power transmission of this class.

The transmission of this application comprises a power input shaft and a power output shaft, and a tier of discs having mutually confronting parallel faces; alternate discs of the tier constituting two sets of discs.

The two sets are mounted to rotate respectively with the input and output shafts and to have movement axially relative thereto respectively; and means is provided to maintain oil or other liquid films between the confronting faces of the discs.

Means is provided to cause the liquid films to exert forces on the discs tending to separate them; and operable means is provided to move them toward each other in the tier against said force to vary the film thickness, and, as a consequence, to vary the torque and power transmitted from one set of discs to the other.

In these general respects, the transmission of this application is similar to that of the aforesaid patent; and the present invention may be considered as having for its objects improvements thereover.

It is among these objects of the present invention:

To provide in an improved transmission of the class referred to:

An improved construction of discs;

Improved means for supplying liquid to the films between the discs;

Improved means for producing the aforesaid separating forces on the discs;

Improved operable means for controlling the thickness of the films for the purposes mentioned above;

Improved means to conduct away heat developed in the films;

Improved means in the construction of the discs and the mounting thereof for causing the spaces between confronting discs faces and the films therein, to be of substantially uniform thickness without requiring that the confronting faces of the discs be accurately made of planar form;

Improved means for draining the liquid films out of the tier of discs when they are at rest;

An improved general arrangement of the parts of the transmission to render it reliable and efficient in operation, simple to control, and cheap to manufacture.

Other objects will become apparent to those skilled in the art to which the invention appertains.

One embodiment of the invention is fully described in the following specification taken in connection with the accompanying drawing in which:

Fig. 1 is a view of an apparatus embodying the invention, showing the outside of a mechanism enclosing housing, in end elevation, as viewed in the direction of the arrow 1 of Fig. 2;

Fig. 4 is a cross sectional view of the housing and enclosed mechanism from the plane 4—4 of Fig. 2 or of Fig. 3;

Figure 2:
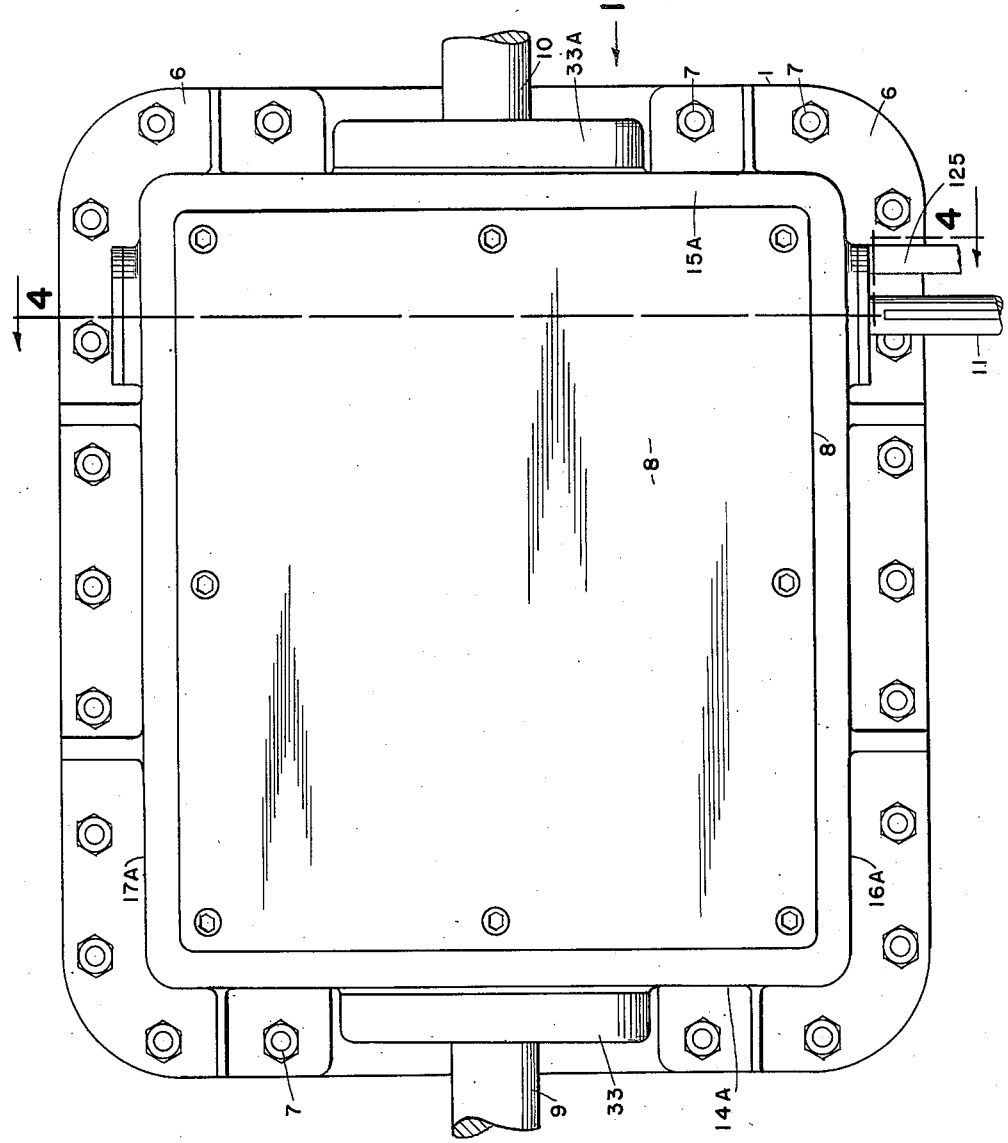
Fig. 2 is a top plan view of the outside of the mechanism enclosing housing.
Figure 3:
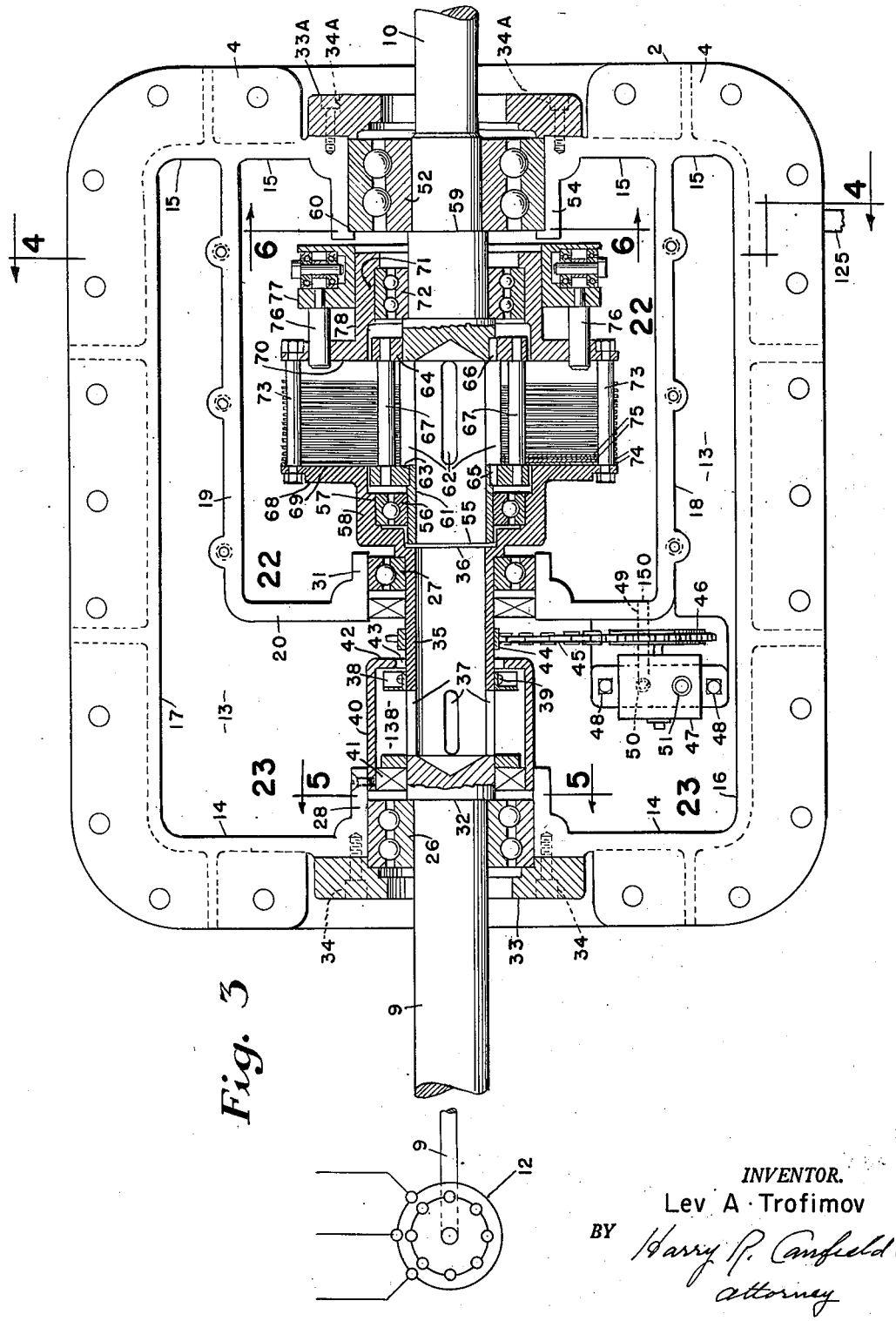
Fig. 3 is a top plan view with an upper part of the enclosing housing removed and showing the mechanism therein with parts in longitudinal horizontal section.

Figs. 5 and 6 are fragmentary sectional views from the planes 5—5 and 6—6 respectively of Fig. 3 showing fragments of both the upper and lower parts of the housing;

Fig. 7 is a fragmentary sectional view from the plane 7—7 of Fig. 4;

Fig. 8 is a fragmentary view in the direction of the arrow 8 of Fig. 7;

Fig. 9 is a view of a part of Fig. 3 to larger scale;

Fig. 10 is a view from the plane 10—10 of Fig. 9;

Fig. 11 is a view in the direction of the arrow 11 of Fig. 10;

Fig. 12 is a view from the plane 12—12 of Fig. 9;

Fig. 13 is a view in the direction of the arrow 13 of Fig. 12;

Fig. 14 is a fragmentary sectional view from the plane 14—14 of Fig. 10 illustrating the form of a slot;

Fig. 15 is a view illustrating a step of the process of forming the slot of Fig. 14;

Fig. 16 is a view illustrating another step of the process of forming the slot of Fig. 14;

Fig. 17 is a view, with parts broken away and in section taken in general in the direction of the arrow 17 of Fig. 4, but with added parts not shown in Fig. 4;

Fig. 18 is a view similar to Fig. 17 but illustrating a modification.

Referring to the drawing, Figs. 1 to 4, there is shown at 1 a housing comprising a base part 2, with mounting and supporting feet 3—3, and flanges 4—4 at its top; and at 5 an upper part having similar flanges 6—6, bolted to the flanges 4—4 by bolts 7—7; the top part 5 being upwardly open as shown in Fig. 4 for interior access, and having a removable bolted-on cover plate 8 for normally closing it.

The mechanism to be described is entirely enclosed in the housing except for a power input shaft 9 and a power output shaft 10, projecting from its ends, and a control shaft 11 projecting out of one side.

A showing of the housing end opposite to that shown in Fig. 1 would be a duplicate thereof and has been omitted.

The power input shaft 9 is to be connected to a power supplying motor, running continuously at full speed; and in Fig. 3 a squirrel cake induction motor 12 has been indicated.

As best shown in Figs. 3 and 4, the housing when assembled as described, comprises a bottom wall 13 and an outer wall comprising outside end walls 14—15 and outside side walls 16—17 rising from the bottom wall 13 to the top where it is closed by the cover plate 8.

Within the outer wall are inner side walls 18—19 spaced from the outer side walls 16—17, and connected by an inner end wall 20 and, oppositely joined to the outer end wall 15; the walls 18—19—20 rising from the bottom wall 13 and terminating short of the top of the outer side walls as at 21.

The inner walls 18—19—20 are spaced from the outer walls 16—14—17 respectively; and there is thus provided an inner compartment 22 enclosed on the sides and one end by a U-form outer compartment 23.

For convenience of manufacture and assembling, and as shown in Fig. 4, the said outer walls of the top housing part 5 meets the outer walls of the base part 2, on a juncture plane indicated at 24, on which plane the two parts are bolted together by the bolts 7—7; the outer walls of the lower part identified by the reference characters 16—17—14 and those of the upper part by the same characters with the suffix A.

In accordance therewith the inner walls 18—19—20 are made in upper and lower sections meeting at said plane 24, the lower section identified by the reference characters 18—19—20 and the upper section by the same reference characters, with the suffix A; and the two sections joined at said juncture plane by screws 25—25 projected downwardly through the upper section and threaded into the lower section.

The input shaft 9 as shown in Fig. 3, is supported on ball bearings 26 and 27. The bearing 26 is seated within a tubular flange 28 extending from the end wall 14—14A, one half of which is formed on the outer wall 14 and the other half on the wall 14A, and the two halves clamp the bearing 26 therein, see Fig. 5.

The bearing 27 is similarly clamped within a two part tubular flange 31, extending from the end wall 20—20A half of it on the inner wall 20 and half on the inner wall 20A.

The bearing 26 abuts between a shoulder 32 on the shaft 9 and an end ring 33 mounted on the end walls 14 and 14A by screws 34—34. (A similar ring 33A to be referred to is shown in elevation in Fig. 1.)

The input shaft 9 is hollow or of tubular form as at 35 inwardly beyond the bearing 26, and the shaft proper terminates at 36 just beyond the bearing 27. The tubular shaft part 35 has a plurality of slot like ports 37 therethrough. A centrifugal pump 138 comprising a rotor 38 of the vane type, stamped from sheet metal, is telescoped over the tubular shaft part, and secured thereon by screws 39.

A stationary pump housing 40 of tubular form is telescoped at one end into the aforesaid flange 28 and is sealed upon the shaft 9 by an internal seal 41 (indicated symbolically), and overlaps the ports 37 and the pump rotor 38, and has an inwardly projecting end flange 42 beyond the rotor, spaced from the shaft 9 to provide a pump inlet 43.

When the pump housing 40 is submerged in oil as will be described, the rotor 38, rotated by the shaft 9, draws oil in through the inlet 43 and pumps it into the pump housing 40 and thence through the ports 37 into the interior of the tubular part 35 of the input shaft 9 for a purpose to be described.

A sprocket wheel 44 is mounted on the shaft 9 in any suitable manner to rotate therewith, and is connected by a sprocket chain 45 to a sprocket wheel 46 on the shaft of a rotary pump 47 mounted by screws 48 upon the bottom wall 13. The pump 47 has an inlet duct 49 leading from its intake port 50, to the interior of the inner compartment 22 near the bottom wall 13 as at 150; and has an outlet port 51 discharging into the outer compartment 23, for a purpose to be described.

The output shaft 10 is coaxial with the input shaft 9, and is supported in a ball bearing 52 clamped within a tubular flange 54 extending from the end wall 15—15A and in two halves see Fig. 6 similar to the tubular flange 28, and the free end of the shaft terminating at 55, is supported in a ball bearing 56, seated in a cylindrical bore 57 formed in a flange 58 formed upon the end of the input shaft 9 (or formed separately and welded thereto) and to be described; and transverse load on the end of the shaft 10 is thus transmitted to the end of the shaft 9 and thence to the ball bearing 27, while allowing the two shafts to rotate independently of each other.

The ball bearing 52 abuts between a shoulder 59 on the shaft 10 and the aforesaid end ring 33A which is held upon the end walls 15—15A by screws 34A see Fig. 1 and may also abut upon a shoulder 60 on the tubular flange 54.

The inner end portion of the shaft 10 is hollow or tubular as at 61 and has a plurality of slot-like ports 62—62 therethrough; and by this means, oil pumped into the tubular port 35 of the input shaft 9, may flow therefrom into the tubular part 61 of the shaft 10 and out at the ports 62—62 for a purpose to be described.

Longitudinally spaced rings 63—64 are telescoped over the shaft 10 and secured thereto to rotate therewith by any suitable interlock, that shown being simplified as keys 65—66; and a plurality of angularly spaced inner pins 67—67, parallel to the shaft 10, are connected at their opposite ends to the rings 63 and 64; the rings 63—64 and ports 62—62 being disposed so that the pins are radially outward of the ports.

The said flange 58 has a radial extension 68, the inner face 69 of which is in a plane at right angles to the axis of the shafts 9—10.

Spaced axially from and opposite to the flange extension 68 is a like flange extension 70 on a tubular support 71, mounted to rotate on a ball bearing 72 on the shaft 10. A plurality of angularly spaced pins 73—73, parallel to the shaft 10 and to the pins 67—67 are mounted to connect outer portions of the two flange extensions 68 and 70; the ball bearing 72 constituting an outboard bearing for the pins 73—73.

Discs 74—74 alternating with discs 75—75 are mounted on the pins 67 and 73 to be described, see Fig. 9.

A plurality of control pins 76—76 (two only being shown) disposed parallel to the shaft 10, project at one end through suitable holes in the flange extension 70, and at their other ends are secured to a fork-ring 77, having an inner cylindrical coaxial bore slidingly fitting upon a coaxial cylindrical surface 78 on the tubular support 71, whereby the fork ring 77, pins 76—76 and flange extension 70 may all rotate in unison on the bearing 72; and whereby the fork ring 77 (by means to be described) may be reciprocated axially on the surface 78 to move the pins inwardly and outwardly of the flange extension.

As to thus axially moving the fork ring, there is shown at 11 (see Fig. 4) the aforesaid control shaft; mounted at opposite ends in ball bearings 80—81 and disposed above and extending at right angles to the shaft 10; the ball bearings being mounted in cylindrical recesses 82—83 in the walls 16A and 17A and retained therein by plates 84—84; one end of the control shaft extending outwardly as at 86, upon which may be keyed an operating arm (to be described) for rocking the shaft 11.

A pair of arms 87—88 depend from the shaft 11 and are secured rigidly to the shaft (and therewith constitute a fork). This connection may be made in any suitable manner, but to provide for adjustably positioning the arms along the shaft, the construction of Figs. 7 and 8 is preferred, wherein an eye 89 on the arm surrounds the shaft 11, and a key 90 in keyways in both the shaft and the eye lock the arm against turning on the shaft, but permit it to be adjusted along the shaft, and a set screw 91, through the eye and abutting on the key, locks the eye from axial shifting after its axial adjustment.

Upon the lower ends of each arm are mounted a pair of wheels in the form of axially spaced ball bearings 92—92 and 93—93, see also Fig. 3 and Fig. 9. The inner races of the pairs of bearings are mounted on pins 94—95 and the pins supported in bores in the ends of the arms, 87—88.

The said fork ring 77 has a groove 96 into which the arms 87—88 and their wheels extend. The groove has axially opposite annular faces 97—98 in planes at right angles to the shaft 10 upon either of which the wheels may roll upon rocking of the fork ring 77 as described.

When the control shaft 11 is rocked in one direction, say from the observer as in Fig. 4, the wheels 92—92 and 93—93 will engage the face 97, and, even during rotation of the control pins 76—76 will move them inwardly; and upon rocking the shaft 11 in the other direction, will engage the face 98 and move the pins 76—76 outwardly.

The said discs 74—74 and 75—75 will now be described. They are shown in simplified form in Fig. 3 because of the small scale of the drawing and are best shown for description purposes in Figs. 9 to 13.

The discs 74 and 75 are different from each other and are best shown in Figs. 10—11 and 12—13; and best shown assembled in the tier in Fig. 9 to which the following description is directed.

As mentioned, a plurality of discs 74—75 are disposed in a tier, the discs 74 alternating with the discs 75 in the tier and thus may be considered as constituting two sets of discs; 74 and 75.

The discs 74 are die-stamped, out of flat sheet metal, preferably bronze by a single operation. They are shown exteriorly circular but can be square or rectangular to simplify the stamping die.

Near the periphery they have a circular coaxial series of four holes 99—99 sized to fit loosely on the outer pins 73—73 whereby the pins support them and allow them to slide freely axially and rock slightly thereon.

A center hole 100 is provided large enough to clear the inner pins 67—67.

A plurality of preferably radial slots 101—101, are provided preferably equally spaced apart and of equal radial extent, opening at their radially inner ends into the center hole 100, and closed at their outer ends as at 102.

The side edges of the slots 101 are bevelled or chamfered as at 103—103, see Fig. 14. It has been found that this chamfering operation can best be done with a pressure coining die. As shown in Fig. 15, the stamping die will draw the metal inwardly a little on the approach side of the sheet metal as at 104 and leave a projecting fin or burr as at 105 on the other side, as is well known in stamping thin sheet metal. After the slots are thus first formed, the disc is pressure-squeezed between dies 106—107 Fig. 16 and having projections 108—109 that enter and fit the slot, and which have rounded or bevelled or convex corners 110—111 that coin or press back the fin 105 into the metal of the disc and leave both edges of the slot on both faces of the disc with rounded or bevelled or chamfered surfaces 103—103.

In some cases, the edge corner as at 103 Fig. 14 will be sufficiently bevelled by the stamping die as described, and the fins 105—105 may be worn off and rounded sufficiently by tumbling the discs in a tumbling barrel.

The discs 75—75 are made from circular blanks die-stamped out of sheet metal, preferably steel, and have a coaxially circular series of holes 112—112 sized to fit loosely on the inner pins 67—67 whereby the pins support them and allow them to slide freely axially and rock slightly thereon.

A center hole 113 is provided large enough to clear the tubular portion 61 of the shaft 10, with small but substantial clearance as at 114.

After the discs 75 are thus blanked out, a plurality of slits are formed in them as at 115.

The slits 115 are open at the periphery of the discs as at 116 and lie at an angle to a radius of the disc and at their inner ends open into circular holes 117.

The preferred way to make these slits is to make up a pile or tier of the blanks and clamp them together; and drill the holes 117 and mill or saw the slits proper, 115, in all of the blanks at the same time. A stamping die could be used, instead, but some difficulty would be encountered due to the narrowness of the slit and due to the formation of burrs at its edges.

To illustrate certain relations and proportions of the discs 74 and 75 a disc 75 is shown in Fig. 10, behind the disc 74, and a relative position for the slots and slits has been selected at 119 for description purposes. The slit proper 115 is as shown at an angle of about 10° to the axis of the slot 101. The outer periphery 118 of the disc 75 extends beyond the outer end of the slot 101 as at 120; the circular inner terminal 117 of the slit 115 is at least as large in diameter or preferably a little larger than the width of the slot 101, and is disposed approximately at the inner end thereof.

The tier of discs is provided with a terminal or end disc 74A (Fig. 9) which is similar to the discs 74, that is, it has pin-holes 99—99 by which it is mounted on the pins 73—73; and has a center hole 100; but the slots 101 are omitted; and thus being like the discs 74 except as to the slots, has not been separately illustrated.

Other parts not heretofore described will be described in connection with a description of the operation of the transmission which follows.

Oil is put into the compartments 22 and 23 to a common level well below the fork ring 77 and therefore below the lower peripheries of the discs 74—75, such equalized level being indicated as at approximately the line 121, Fig. 4. Suitable holes, normally closed by pipe plugs not shown may be provided for this filling purpose, preferably at a low point, whereby they may also be used for draining out the oil.

When the control pins 76—76 are projected inwardly by rocking the control shaft 11 as described, they will engage the end disc 74A and thereby put axial pressure upon all of the discs 74—75 in the tier, and the most remote disc 74 will be pressed against the inner face 69 of the radial flange extension 68, which face is disposed in a plane at right angles to the axis of the shaft 9. At the beginning of operation the control pins 76—76 are in a retracted position, freeing the discs from pressure.

It is assumed that a load to be driven is connected to the output shaft 10.

The motor 12 is started and comes up to full speed and thereafter runs continuously driving the input shaft 9 always at full speed.

The pump 47 is immediately driven at full speed, by the shaft 9 and sprocket chain drive 44—45—46, and pumps oil from the compartment 22 into the compartment 23 raising the level in the latter and causing it to submerge the centrifugal vane pump 138 and causing the vane pump to pump oil through the ports 37—37 into the tubular portion 35 of the shaft 9, thence into the tubular portion 61 of the shaft 10, out through the ports 62 of the latter, and into the center holes 100 and 113 of the discs 74 and 75.

The pins 73—73, connected to the shaft 9 as described are also being driven at full motor speed and being in the holes 99 of the discs 74 and the end disc 74A, drive these discs at full motor speed.

The vane pump 138 is a low pressure pump and need supply only enough oil pressure to submerge the peripheries of the larger center holes 100 of the discs 74; the oil, then being in contact with the faces of those discs, centrifugal force pumps the oil over the disc faces and throws it out from the disc peripheries, whence it falls into the compartment 22, to be picked up again by the pump 47.

Between each pair of discs 74 is a disc 75. The oil therefore forms in films between adjacent discs 74 and 75, and fills the slots 101 of the discs 74. The discs 74 are being driven at full motor speed, and the oil in the slots 101 is acted upon by the chamfered edges 103 of the slots and is wedgingly forced thereby into the film space and the wedging force develops hydraulic pressure in the axial direction tending to force the adjacent discs apart and increase the thickness of the oil films.

The control pins 76—76 may at this time be set at an inward position (or moved to an inward position by rocking the control shaft) at which the oil films are of such thickness as to transmit torque from the discs 74 to the discs 75, by oil friction within the films but with the discs out of contact with each other.

The discs 75, being mounted on the pins 67—67, the pins transmit this torque to the output shaft 10 by the construction described.

The torque thus transmitted through the oil films is proportional to the viscosity of the oil, the thinness of the films, and the slip or relative speed between the discs 74 and 75 (as referred to in said pending patent application).

The transmitted torque can therefore be increased by forcing the discs closer together in the tier by the control pins 76—76, in opposition to and overcoming the said hydraulic force tending to separate them, effected by rocking the control shaft 11 as described.

While the load on the output shaft 10 is being started and accelerated by torque as just described, and at a rate determined by the extent of rocking of the control shaft 11, the discs 75 slip relative to the discs 74 but out of contact therewith. When full speed of the output shaft is attained, the film will have been made very thin and the slip small and then the control shaft 11 may be given a final rocking increment to cause the control pins 76—76 to press the discs into actual face to face contact. The transmission of torque through films will then be discontinued and the discs 74 will drive the discs 75 directly by frictional engagement, but due to the pressure on the disc faces, driving by contact will be without slip and disc wear.

Subsequently, if the disc contact pressure is relieved by rocking the control shaft 11 in the other direction, then on the instant that the discs begin to slip, the aforesaid wedging action and axial hydraulic separating force on the discs moves them apart and they begin driving through the films again.

It is obviously desirable that the disc films shall be of equal thickness throughout the tier. To this end, the discs are mounted loosely on the pins 73—73 and 67—67 and free to adjust themselves to parallelism. If the film should become thinner at one point than at another, the axial pressure at that point would predominate and the disc would be rocked thereby and adjust itself to film thickness equality.

The discs 75, because of the four slits 115, comprise four sectors, which are slightly yieldable, resiliently, one relative to another, in the axial direction.

It has been found that with this construction of discs 75, it is not necessary to perform any machining or grinding operation on the faces of either of the discs 74 or 75 to make them flat or planar and maintain the films therebetween without disc face contact even when the films have been squeezed thin. The disc 74 when made from bronze as preferred will come planar as to its faces, by a little squeezing or coining pressure on the disc by the stamping die at the end of its stroke.

If the faces of the discs 75 should not be perfectly flat or planar, and if the film should accordingly tend to be thinner on the face of one said sector than on the face of another, the sector would yield under the predominating pressure and conform the sectors to a common plane.

There are additional functions for the outwardly open slits 115 of the discs 75, as follows.

It is desirable for the outer ends of the radial slots 101 of the discs 74 to be substantially closed, in order that oil flowing into them will not have free discharge out of them but will maintain them filled so that they may act as supply reservoirs from which the working film can be developed over the whole radial extent of the disc faces. Were it not for such radially extensive reservoirs, the oil propelled outwardly radially through the film space by centrifugal force would break up into streams and not maintain an oil film over the entire disc face, because the entrance of oil to the film space would be that at the periphery of the center hole 100 and limited or throttled thereby whereas the area to be supplied with film oil is of greater area due to being farther out radially.

On the other hand, however, heat tends to accumulate in the discs due to the development of heat in the oil films caused by friction within the film, and it is desirable to have a free flow of fresh oil to carry away the heat.

The slits 115 provide this fresh oil flow. These slits are disposed at an angle to the radial slots 101; and as shown for the four respective slits 115 of Fig. 10, cross the slots 101, at successive points radially; and therefore as the discs 74 slip relative to the discs 75, each slit 115 opens into a slot 101 for a short period of slipping time; and oil in the slot 101 may flow into the slit 115 during this period of time and flow directly out at the open end 116 of the slit.

Thus intermittently, a limited flow of fresh oil goes from the center hole 100 radially directly to the outside periphery of the tier by way of the slots 101 and slits 115. If desired, a small continuous flow through the slits 115 may be provided by disposing the circular inner end 117 of the slit so as to project inwardly slightly beyond the periphery of the center hole 100 as at 122 Fig. 10.

Rocking of the control shaft 11 as described, changes the pressure on the disc tier and the thickness of the oil films and the transmitted torque, so that by suitably controlling the rocking of the control shaft, control of the torque and power transmitted to the load by the load shaft 10 may be effected.

Any suitable means may be provided for this purpose. A simple manual means is shown in Fig. 17.

A depending arm 123 is keyed to the shaft end 86, and has a screw 124 threaded through its lower end. The screw is anchored at one end against endwise movement, upon a post 125 projecting from the side of the housing, by a stem 126 going loosely through a hole 127 in the post, and a shoulder 128 on the screw and a pin 129 in the stem at the opposite ends of the hole, and the screw has a handle 130 on the other end for turning it.

Turning the screw 124 by the handle 130 will propel the arm 123 through an angle in either direction to correspondingly rock the shaft 11. The looseness of the stem 126 in the hole 127 allows for angular tipping of the stem in the hole as the arm 123 is rocked.

With this means of control, as will be apparent, the control shaft will be held rigidly in different rocked positions and the discs will take up definite corresponding film-thickness spaced positions.

With this type of control, the discs can be positioned for a predetermined film thickness and if the load tends to slow down, the slip between the sets of discs will increase and increase the transmitted torque and tend to prevent slowing down; and vice versa if the load tends to speed up; so that the load speed is held constant or in a limited range of speed variation.

Another means of control is shown in Fig. 18. A screw 131, in a housing-supported post 132, is screwed in or out by a handle 130. An arm 133 depends from the control shaft end 86 and has a hole 134 in it through which a stem 135 on the screw extends. A shoulder 136 on the screw engages a washer 137. A spring 141 around the stem 135 abuts between the arm 133 and the washer 137. The stem is held in the hole 134 against axial force of the spring tension, by a washer 139 and pin 140 on the other side of the arm.

With this type of control, the handle 130 may be turned to propel the screw toward the left and rock the arm 133 in the direction to put pressure on the discs in opposition to the said hydraulic disc separating film pressure. When the slip at the tier discs is great, the spring 141 and film pressure may be balanced at a predetermined film-thickness, and corresponding torque will be transmitted to the load. As the load speeds up, the slip will decrease and decrease the aforesaid disc separating pressure, and tend to decrease the transmitted torque; but the spring 141 will force the discs closer together, and restore the balance and maintain the transmitted torque.

Thus the spring 141 will maintain the transmitted torque by decreasing the film thickness as the load speeds up; and by suitably predetermining the spring pressure, the discs will be forced into actual contact when slip ceases and initiate direct drive through the disc contact as described. If the load increases enough to cause slip at the discs, the wedging apart force at the discs will at once begin and overcome the spring 141 and transmission through disc films will be restored.

When the motor 12 is shut down, and the discs 74 stop being driven and therefore discontinue the disc-separating oil-wedging action, oil between the discs may tend to hold the discs of the tier together by capillarity, even if the control shaft be rocked to withdraw the control pins 76—76; and it is desirable for the discs to be free from each other when the motor is again started. To this end the oil is scavenged out of the tier when the motor stops, as follows.

When the motor 12 stops, the sprocket driven pump 47 stops maintaining the oil level to submerge and feed the vane pump 138 and it stops supplying oil to the tier.

A pump 47 is chosen of a type through which the oil at high level in the compartment 23 can bleed back through the pump into the compartment 22, when the pump is at rest; and this equalizes the level in the two compartments to the level at 121 which, as described, is always below the periphery of the discs.

Oil in the vane pump 138 drains off into the compartment 23.

Thus when the motor 12 is again started and immediately drives the discs 74 at full speed, no oil will be supplied to the discs until the pump 47 has again raised the oil level in the compartment 23, and in the meantime centrifugal force throws all of the oil out of the tier of discs and into the compartment 22.

The slots 101 have been shown and described as radial, but they may if preferred be at an angle to the radial direction.

The invention is not limited to any particular number of slots 101 in the discs 74 or of slits 115 in the discs 75. If too many slots 101 are used, the area of the transmitting films and the torque transmitted by the films will be reduced unduly; and if too few are used, some of the film developed between slots may be thrown out by centrifugal force and likewise reduce the area of the working film.

Figs. 9 to 13 have been drawn to full scale in the drawing as filed with this application, as suitable for a twenty-five horse power transmission; and a suitable tier of discs will comprise fifteen discs 74 having each twenty-four slots 101, alternating with fifteen discs 75 having each four slits 115.

Ordinary machine oil may be used but it is preferred to use an oil or liquid having the minimum decrease of viscosity with rise of temperature.

When the tier is partly compressed by the pins 76, there will be an end space between the end disc 74A and the flange extension 70 which, it might seem, would act as a by-pass for the oil supplied from the ports 62—62, and that the oil might flow through the by-pass and not flow over the discs; but the oil is copiously supplied to the ports 62—62 and is not under great pressure and coming from the left as viewed in Fig. 9, reaches the center holes of the discs first and at once is picked up by centrifugal force and carried out between the discs. In practical operation it has been found that the said end space does not by pass the discs as referred to.

In Fig. 9, the control pins 76 are shown in solid line in fully retracted positions and in broken line in fully inwardly projected positions, to illustrate the range of movement thereof. The tier of discs is shown in fully compressed condition with the discs in direct driving contact, because showing them with oil film therebetween would render the showing obscure. For this reason also, the showing of oil in other parts of the drawing has been omitted.

It may be added that when the control pins are fully retracted the separating action on the discs may separate them sufficiently to substantially fill the entire space between the radial extension 68 and the flange extension 70.

I claim:

1. In a power transmission of the disc-tier type; a main frame; power input and output shafts supported on the frame for independent rotation on substantially a common axis; a tier of annular discs having central openings surrounding the shaft axis and having mutually confronting flat faces; means connecting alternate ones of the discs in two sets to the two shafts respectively to support them and to cause them to rotate with the respective shafts and to have movement axially of the shafts; the discs of one set having each a plurality of slots therein opening inwardly into its central opening and closed at their outer ends; and the side edges of the slots being chamfered; the discs of the other set having each a peripheral portion extending beyond the closed ends of the said slots, and having slits therein extending at an angle to the said slots of the other discs, and the slits being open at the disc periphery and closed at their inner ends outwardly of the disc central opening; the closed end being inwardly of the periphery of the central opening of the slotted discs.

2. In a power transmission of the disc tier type, output and input shafts mounted for independent rotation on a main frame; a tier of annular sheet metal discs having central openings, and flat mutually confronting faces; alternate discs each having a circular series of slots open at the central opening and closed at their outer ends; the corners between the sides of the slot and the disc face being chamfered; the other alternate discs each having a circular series of slits open at the disc periphery and closed at their inner ends; the slots and slits of adjacent discs of the tier extending at different angles in relation to each other; the discs of the tier mounted upon outer and inner parallel pins extending loosely through perforations in the outer portions of the slotted discs and inner portions of the slitted discs; the outer and inner pins connected respectively to the two shafts; and means for adjusting in small increments the distance between the end discs in the tier.

3. In a power transmission of the disc tier type, output and input shafts mounted for independent rotation on a common axis on a main frame; a tier of annular sheet metal discs having central openings, and flat mutually confronting faces; alternate discs constituting a first set each having a circular series of slots open at the central opening and closed at their outer ends; the corners between the sides of the slot and the disc face being chamfered; the other alternate discs constituting a second set each having a circular series of slits open at the disc periphery and closed at their inner ends; the slits of the discs of the first set extending at different angles in relation to the slots of the discs of the second set; a plurality of elements disposed in two groups connected to the two shafts respectively, and having portions parallel to the common axis; and spaced radially therefrom; the parallel portions of one group extending loosely through apertures in one set of discs, and the parallel portions of the other group extending loosely through apertures in the other set of discs; and means for adjusting in small increments the distance between the end discs in the tier.

4. In a power transmission of the disc-tier type; a main frame; power input and output shafts mounted for rotation on the frame relative to each other on substantially a common axis; a tier of annular discs coaxial with the shafts and having mutually confronting parallel faces; said discs having central openings formed therein; alternate discs of the tier being slidably mounted to the power input shaft and alternate discs of the tier being slidably mounted to the power output shaft; means to supply a fluid during operation to said central openings of the discs to be carried by centrifugal force outwardly between the faces of the rotating discs; alternate discs of said tier having slots therein opening inwardly into their central openings and closed at their outer ends, the side edges of the slots being chamfered to force oil between the discs during operation to develop hydraulic pressure; alternate discs of said tier having a plurality of slots therein which are open at the disc periphery and closed at their inner ends; the slots of the one group of discs extending at an angle to the slots of the other group of discs so that during the relative rotation of the discs the slots of adjacent discs cross at successive points radially to maintain the flow of fresh fluid during operation; and adjustable means to control the separation between the slots, thereby controlling the torque transmitted from the input to the output shaft.

5. In a power transmission of the disc-tier type, the combination as set forth in claim 4 wherein the inner ends of each of the slots which are open at the disc periphery are provided with an enlarged opening.

6. In a power transmission of the disc-tier type, the combination as set forth in claim 4 wherein one of said power shafts extends through the central openings formed in the discs of said disc-tier and wherein the means to supply a fluid to said central openings of the discs includes a pump located coaxially on one of said power shafts; said pump comprising an outer housing surrounding the shaft, an opening at one end of the housing, the edge defining said opening surrounding the shaft to provide an entrance therebetween to admit fluid into the housing; and a plurality of vanes mounted to the shaft for drawing fluid through said entrance; and a passage in said shaft for conducting the fluid from said pump housing to the central openings formed in the discs of said disc-tier.

7. In a power transmission of the disc-tier type; a main frame; power input and output shafts rotatably mounted in the frame; a tier of annular discs surrounding and coaxial with the output shaft, and having mutually confronting parallel faces; alternate discs of the tier being connected to rotate with the input and output shafts, respectively; one of said power shafts having an axially extending bore therein and outlet ports therefrom disposed inwardly of the disc-tier; the main frame comprising a reservoir for a fluid at a level below said power shaft; a first pump driven by the inspect shaft and having an inlet above the said level; the first pump being mounted coaxially on the input shaft; a second pump driven by one of said power shafts and having intake communication with the liquid in the reservoir and output communication with the first pump inlet within the main frame for elevating and supplying the fluid to the first pump inlet; and output connections from said first pump to the said shaft bore, whereby the fluid is supplied via the shaft bore and through the ports to inner portions of the disc-tier.

References Cited in the file of this patent

UNITED STATES PATENTS

| | | |
|---|---|---|
| 776,404 | Keyser | Nov. 29, 1904 |
| 1,526,203 | Buisson | Feb. 10, 1925 |
| 1,617,717 | Lombard | Feb. 15, 1927 |
| 1,722,522 | Hahn | July 30, 1929 |
| 1,803,430 | Hand | May 5, 1931 |
| 1,825,980 | Reed | Oct. 6, 1931 |
| 1,858,947 | Aitken | May 17, 1932 |
| 1,928,301 | Pierson | Sept. 26, 1933 |
| 2,079,724 | Van Ranst | May 11, 1937 |
| 2,150,950 | Thoma | Mar. 21, 1939 |
| 2,522,622 | Laurant | Sept. 19, 1950 |
| 2,576,156 | Trofimov | Nov. 27, 1951 |
| 2,601,076 | Winther et al. | June 17, 1952 |
| 2,624,437 | Gardner | Jan. 6, 1953 |

FOREIGN PATENTS

| | | |
|---|---|---|
| 443,410 | Italy | Dec. 22, 1948 |
| 562,183 | France | Aug. 28, 1923 |
| 579,061 | Germany | June 21, 1933 |
| 622,074 | Great Britain | Apr. 26, 1949 |

OTHER REFERENCES

Ser. No. 322,595, Maier et al. (A. P. C.), published May 18, 1943.